Feb. 7, 1961 L. L. SMITH 2,971,085

SELECTIVE SIGNALING RADIOTELEPHONE SYSTEM

Filed June 22, 1956 2 Sheets-Sheet 1

INVENTOR.
LESTER L. SMITH
BY Wm. Walter Owen
ATTY.

Feb. 7, 1961 L. L. SMITH 2,971,085

SELECTIVE SIGNALING RADIOTELEPHONE SYSTEM

Filed June 22, 1956 2 Sheets-Sheet 2

INVENTOR.
LESTER L. SMITH
BY McWalter Owen
ATTY.

United States Patent Office 2,971,085

Patented Feb. 7, 1961

2,971,085

SELECTIVE SIGNALING RADIOTELEPHONE SYSTEM

Lester L. Smith, McHenry, Ill., assignor to Automatic Electric Laboratories, Inc., a corporation of Delaware Filed June 22, 1956, Ser. No. 593,119

11 Claims. (Cl. 250—6)

This invention relates to selective signalling systems in general, but more particularly, to systems of that character in which a signal sent by one station in a group of stations causes all of the other stations in said group to respond thereto while only one of said other stations is thereby rendered effective to receive subsequent signals.

I have shown my improved signalling system in connecttion with a micro wave telephone system, wherein radio impluses, corresponding to digital impulses, are employed for selecting a desired remote station and establishing a signalling connection between the calling station and the selected remote station.

In selective signalling systems of this type, it has been the usual practice to provide a buzzer or similar device at the various stations, and the transmitted digital impulses corresponding to a particular station are effective to select said particular station and activate said device. A party at said particular station is thereby notified of an incoming call, and a talking circuit is completed when he picks up his handset.

This type of signalling system is somewhat limited in its application, and is not readily adaptable to a telephone system wherein each of the stations is equipped with a group of substations. Applicant's signalling system, however, is much more versatile and provides a means for selectively signalling the individual substations. The digital impulses corresponding to a first group of digits are used to select a particular station in a group, while rendering the other stations in said group inoperative, and digital impulses corresponding to a second group of digits are used to select the desired substation in said selected station.

Accordingly, it is the primary object of this invention to provide a new and improved selective signalling arrangement for contacting a particular one of a group of remote stations, wherein all of said stations simultaneously respond to the transmitted signals.

Another object of this invention is to provide in a telephone system a new and improved arrangement for selectively signalling a particular substation in one of a group of stations, while rendering the other stations in said group inoperative.

Other features of this invention, together with the advantages pertaining thereto, will be best understood from the detailed description which follows. Two sheets of drawings are attached to facilitate this description. Fig. 1 shows a group of four micro wave stations, each embodying the present invention, and Fig. 2 shows a schematic wiring diagram of a restrictor circuit embodying the present invention.

In the preferred embodiment of my invention, a group of micro wave telephone stations, such as stations 37, 48, 64, and 66 in Fig. 1, are provided. Although only four such stations are shown in Fig. 1, it should be understood that additional stations may be provided as necessary. The transmitters are adjusted to transmit at a predetermined frequency, and the receivers at the various stations are all tuned to this frequency.

For purposes of illustration, it will be assumed that a subscriber at telephone 14 in station 37 wants to place a call to a telephone at one of the other stations. This call would be extended from telephone 14 over trunk 5 to transmitter 2 and antenna 1. However, if telephone 14 is called from another station, the call would be picked up by antenna 1 and receiver 2 of station 37, and extended over truck 3 to repeater 4, over trunk 6 to restrictor circuit 7, and then over trunk 11 to connector 12 and telephone 14.

When a call is initiated, and digits are dialled at any one of the stations, the transmitter at said one station is keyed in accordance with the digital impulses. The antenna and receiver at each of the other stations, all being tuned to the same frequency, will pick up the transmitted signal corresponding to these digital impulses, and repeater 4 at each of said other stations repeats these impulses to the corresponding restrictor circuits.

In the telephone system of Fig. 1, a four digit telephone number is assigned to each of the telephones. The first two digits correspond to the station code; and the last two digits cause the vertical and rotary stepping of the connector wiper, in the usual manner. In order to facilitate a thorough description of the present invention, the various telephone numbers will be assumed to correspond with the station and telephone numbers indicated on Fig. 1. Thus, number 3715 corresponds to telephone 15 at station 37, number 6420 corresponds to telephone 20 at station 64, and so forth.

The restrictor circuits shown in Fig. 1, numbered 7, 8, 9 and 10, will extend a call to their respective conductors only when the first two dialled digits correspond to the station code. For example, when telephone number 6420 is dialled at telephone 14 in station 37, the transmitted signal will be picked up by receiver 2 at each of the other stations, and repeater 4 at each of said other stations will send corresponding pulses into circuits 8, 9, and 10. However, circuit 9 is the only one that will extend the call to a connector. This arrangement for selecting a particular group of telephones and restricting other groups, is shown schematically in Fig. 2, and will now be described in detail.

*Detailed description*

Figure 1:
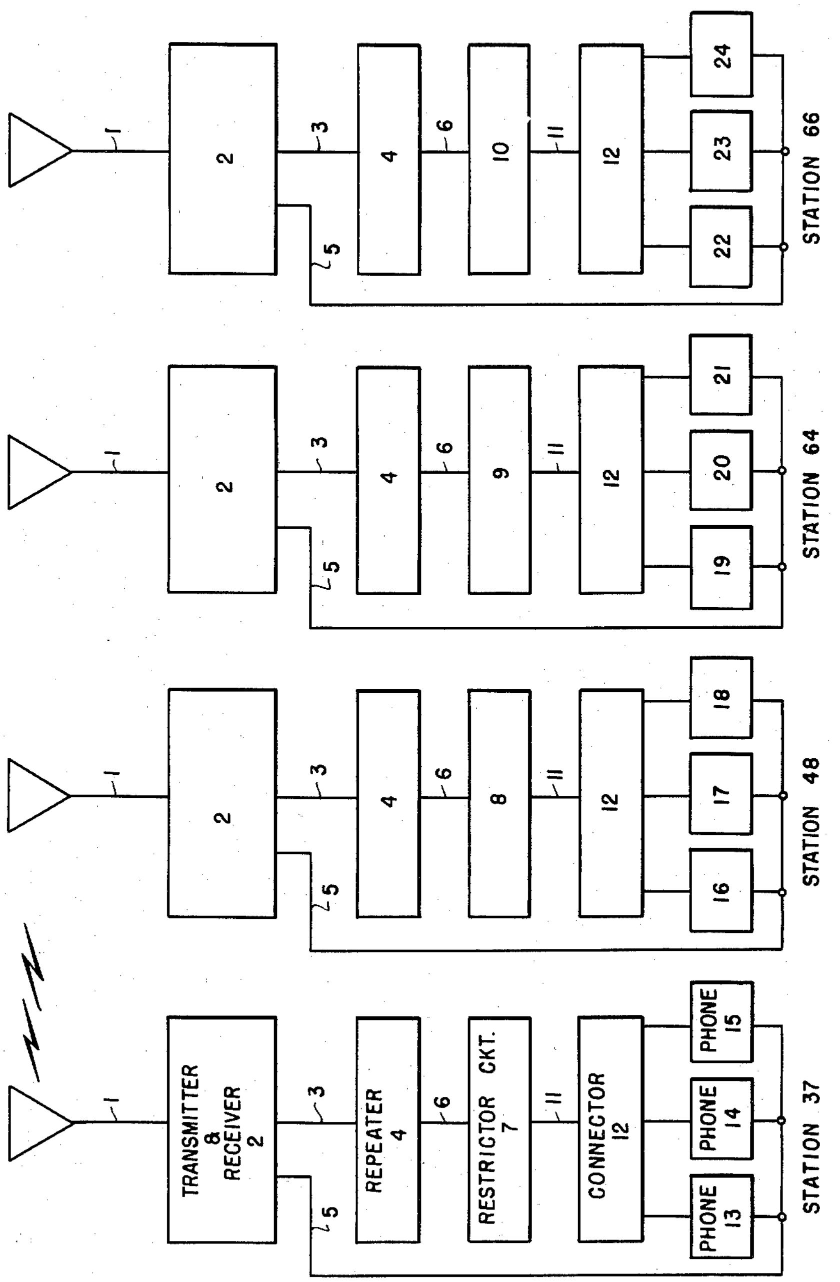
Figure 2:
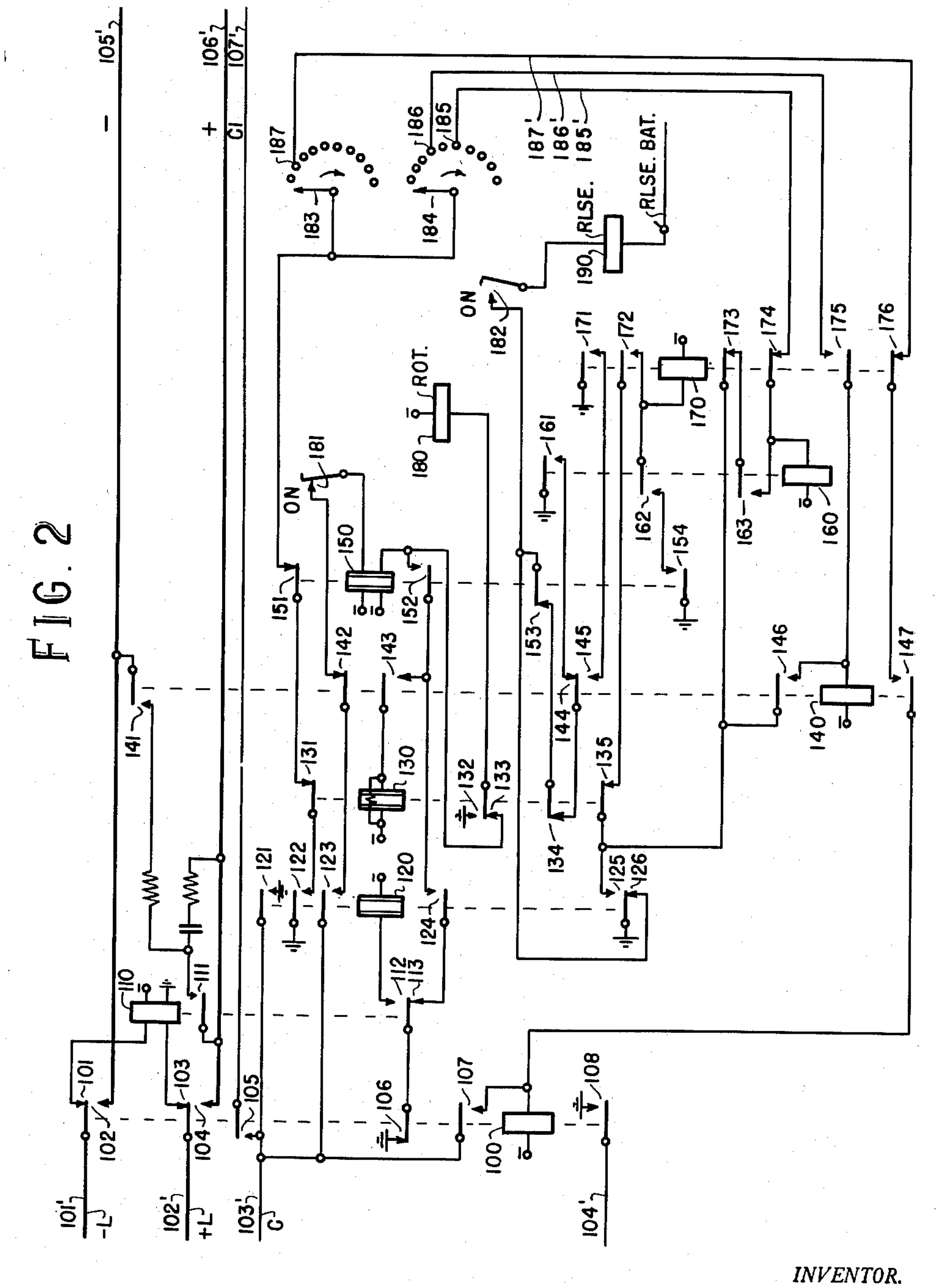

It will be observed that a restrictor circuit such as shown on Fig. 2 is embodied in each of the four stations shown on Fig. 1. Leads 101′, 102′, 103′ and 104′ shown on Fig. 2 correspond to trunk 6 of Fig. 1; and leads 105′, 106′ and 107′ shown on Fig. 2 correspond to trunk 11 of Fig. 1. Restrictor circuit 9 on Fig. 1 is the circuit actually shown in Fig. 2; but circuits 7, 8 and 10 are identical except for the position of leads 185′ and 186′ with respect to the rotary switch bank contacts.

Let us now assume that a call is placed at telephone 3714 to telephone 6421. A signal is transmitted at station 37 in response to initiation of this call, and this signal is received at each of the other stations. Receiver 2 and repeater 4 at each of these other stations are arranged to place a ground on lead 103′, and to place a loop across leads 101′ and 102′, in response to this initiaing signal, thereby seizing the corresponding restrictor circuits. The operation of circuit 9 will be described first, and the corresponding operation of circuits 8 and 10 will be described thereafter.

As seizure, relay 110 will operate over a circuit extending from ground through the bottom of relay 110, through contact 103, over line 102′ and the above-mentioned loop to line 101′, through contact 101, and then through the top of relay 110 to battery. Relay 110 operates, causing contact 112 to complete an obvious circuit for the operation of relay 120. Contact 111 is also closed, but the circuit through this contact is open at contact 141 at this time.

Slow-release relay 120 operates, and its associated contacts cause the following operations: contact 121 places ground on control lead 103′ in the usual manner; contact 122 prepares a circuit to the wipers of the rotary switch associated with motor magnet 180; contact 123 completes an operating circuit for relay 150, from ground through contacts 121, 123, 142, 181, and then through the top winding of slow-release relay 150 to battery; contact 124 prepares a point in the operating circuits of relay 130 and magnet 180; and contact 125 prepares a point in the locking circuits of relays 140, 160 and 170.

Relay 150 operates to complete the seizure of the restrictor circuit, thereby making contacts 152 and 154, and breaking contacts 151 and 153. The circuits through these various contacts are incomplete at this time.

The calling party at telephone 3714 will now dial number 6421. Relay 110 follows the pulses transmitted at station 37, thereby repeating these pulses over contacts 111 and 113. When relay 110 restores in response to the first pulse from substation 14, contact 113 completes parallel circuits through the lower winding of relay 150 and magnet 180, the circuit for relay 150 including contacts 106, 113, 124, and 152. The circuit for magnet 180 includes contacts 106, 113, 124, 152, and 133. The circuits of relay 150 and magnet 180 are thereby closed simultaneously each time relay 110 restores, and opened each time relay 110 reoperates. Magnet 180 causes wipers 183 and 184 to move one step in a clockwise direction upon energization in response to each pulse, off-normal contacts 181 and 182 being operated when the wipers take the first step; and slow-release relay 150 is held operated by the digital impulses until the pulsing for the digit is completed, even though off-normal contact 181 is open. Relay 120, being of the slow-release type, remains operated during the pulsing of relay 110.

As mentioned above, the first digit dialled at substation 14 would be the digit 6, and wipers 183 and 184 will therefore have taken the sixth rotary step when relay 110 reoperates following the last impulse of the first digit. As a result of the opening of contact 181, and the opening of the pulsing circuit through the bottom of slow-release relay 150 after the sixth pulse, relay 150 will restore following its slow-release interval. A circuit is then completed from ground through contacts 122, 131, 151, wiper 184, bank contact 185 and lead 185′, contact 174, and relay 160 to battery. The other contacts associated with relay 150, including contacts 152, 153, and 154, do not complete operative circuits at this time.

Relay 160 now operates, and the contacts associated with this relay cause the following operations: contact 161 completes a circuit from ground through contacts 161, 144, 134, 153 and 182 for operating release magnet 190; contact 162 prepares a point in the operating circuit of relay 170; and contact 163 completes a locking circuit for relay 160, extending from ground at contact 125 through contacts 173 and 163 to relay 160 and battery.

As a result of the operation of magnet 190, wipers 183 and 184 are restored to their respective home positions, and off-normal contacts 181 and 182 are thereby restored to the normal positions shown on Fig. 2. Restoration of wiper 184 opens the original operating circuit of relay 160, but relay 160 is now held operated by the above-described holding path including contact 163. Contact 182 opens the operating circuit of the release magnet, and contact 181 again completes the original operating path of slow-release relay 150 as described above.

Relay 150 reoperates, closing contacts 152 and 154, and opening contacts 151 and 153. Contact 151 thereby opens another point in the operating circuit of relay 160; contact 152 prepares a point in the pulsing path through the bottom of relay 150, and this circuit will be operative when the second digit is dialled at station 37; contact 153 opens another point in the operating circuit of the release magnet; and contact 154 completes an operating circuit for relay 170, including contacts 154 and 162.

Relay 170 now operates, and the contacts associated with this relay cause the following operations: contact 171 prepares a second path for operating the release magnet; contact 172, which operates ahead of contact 173, completes a locking path for relay 170 including contacts 125, 135, and 172; contact 173 opens the holding circuit for relay 160, and relay 160 restores; contact 174 opens the original operating circuit of relay 160; contact 175 prepares a point in the operating circuit of relay 140; and contact 176 opens a point in the operating circuit of relay 100. It should be noted here that contact 172 is arranged to make before contact 173 breaks, in order to prevent relay 160 from restoring and thereby restoring relay 170 by opening contact 162, before relay 170 has had time to lock through contact 172.

The circuit is now prepared for dialling the second digit, and it should be noted that relays 110, 120, 150, and 170 are operated at this time. The subscriber now dials the second digit, which is the digit 4.

Relay 110 restores and reoperates in response to each of the four pulses, wipers 183 and 184 step to the fourth rotary position due to the pulsing of magnet 180, contacts 181 and 182 are operated when the wipers take the first rotary step, and slow-release relay 150 is held operated during pulsing by pulses through its lower winding, all in the manner above-described. After the fourth pulse is received, and the wipers take the fourth step, the circuit through both windings of relay 150 will again be open.

Relay 150 then restores, following its slow-release interval, and the associated contacts cause the following operations: contact 151 completes the operating circuit of relay 140, including contacts 122, 131, 151, 186, and 175; contact 152 opens the pulsing path to relay 150 and magnet 180; contact 153 prepares an operating circuit for release magnet 190; and contact 154 opens a point in the operating circuit of relay 170.

Relay 140 now operates, and the contacts associated therewith cause the following operations: contact 141 closes a 500 ohm loop across leads 105′ and 106′ to seize connector 12 in the usual manner; contact 142 opens the circuit over which relay 150 was originally energized; contact 143 prepares a point in the operating circuit of slow-release relay 130; contact 145 completes a circuit through release magnet 190, including contacts 171, 145, 134, 153, and 182; contact 146 completes an obvious holding circuit for relay 140; and contact 147 prepares a point in the operating circuit of relay 100. Wipers 183 and 184 are restored to their respective home positions, and off-normal contacts 181 and 182 are again restored to normal, contact 182 thereby breaking the circuit through magnet 190.

The restrictor circuit is now prepared to receive digital impulses corresponding to the third and fourth digits of the called party's telephone number. It will be noted that relays 110, 120, 140, and 170 are operated at this time.

As the next two digits are dialled, which are 2 and 1, respectively, in the example, relay 110 will restore and then reoperate in response to each pulse, and contact 111 will thereby repeat these pulses over leads 105′ and 106′ to the succeeding connector. Thus, the connector will step vertically and then rotary in the normal manner to the bank contacts associated with the called party's telephone. Contact 113 will also follow the pulsing of relay 110 and the function of this contact will now be described.

When contact 113 is closed in response to the first pulse of the third digit, a circuit is completed for operating slow-release relay 130, including contacts 106, 113, 124, and 143. It should be noted that relay 150 and magnet 180 will not be energized at this time, since contact 152 is open. Relay 150 did not operate following the second digit since contact 142 was open at that time. Relay 130 remains operated throughout the pulsing of contact 113, due to its slow-release feature.

When relay 130 is energized over the above-described circuit, contacts 131, 134, and 135 break, and contact 132 makes. The function of these contacts is as follows: contact 131 holds the ground circuit associated with wipers 182 and 184 open during the pulsing of relay 110 in response to the third dialled digit; contact 132 completes an obvious circuit for energizing rotary magnet 180, and the energization of this magnet causes wipers 183 and 184 to take one step rotary, contacts 181 and 182 being thereby operated; contact 134 opens a point in one of the energizing circuits of magnet 190; and contact 135 opens the holding circuit of relay 170.

Relay 170 is thereby restored, and the contacts associated therewith cause the following operations: contact 171 opens a point in one of the energizing circuits of release magnet 190; contact 172 opens a second point in the holding circuit of relay 170; contact 173 makes, but the circuit to this contact is opened at contact 163 at this time; contact 174 prepares a point in the operating path of relay 160; contact 175 opens the operating path of relay 140; and contact 176 prepares a point in the operating circuit of relay 100.

When relay 110 reoperates following the last pulse of the third dialled digit, contact 112 makes to hold relay 120 operated, and contact 113 opens the circuit to relay 130. Relay 130 restores after its slow-release interval, and the contacts associated therewith cause the following operations: contact 131 connects ground at contact 122 to wipers 183 and 184, and the respective first bank contacts associated with these wipers. Since there is no lead connected to the first bank contacts, the ground at contact 122 is ineffective at this time. Contact 132 breaks, thereby removing the ground from rotary magnet 180 and magnet 180 restores; contact 133 makes, but the circuit through this contact for operating magnet 180 is open at contact 152 at this time; contact 134 makes, but the circuit for operating release magnet 190 is now open at contact 171; and contact 135 makes a point in the incomplete holding circuit of relay 170.

The fourth digit is now dialled at substation 14, whereupon contact 111 repeats the pulses to the succeeding connector over leads 105′ and 106′, relay 130 operates over the above-described circuit including contact 113 and remains operated during pulsing, the rotary magnet is energized, and wipers 183 and 184 take the second rotary step, all in the manner above-described. When slow-release relay 130 restores following its slow-release interval, rotary magnet 180 is deenergized as a result of contact 132 breaking, and a circuit is completed for operating relay 100. This latter circuit extends from ground at contact 122 through contacts 131 and 151, through wiper 183 and bank contact 187, and through contacts 176 and 147 to relay 100 and battery. It should be noted that if lead 187′ were connected to the third bank contact, a fifth digit would have to be dialled at station 37 before relay 100 would operate. Thus, the number of digits that must be dialled before relay 100 will operate can be regulated by the positioning of lead 187′.

Relay 100 operates, and the contacts associated therewith cause the following operation: contact 101 opens a point in the operating circuit of relay 110, and relay 110 restores; contact 102 connects line 101′ to line 105′; contact 103 opens another point in the operating circuit of relay 110; contact 104 connects line 102′ to line 106′; contact 105 connects lead 107′, which will be grounded in the connector at this time, to lead 103′; contact 106 opens the circuit of relay 120; contact 107 completes a holding circuit for relay 100 including contacts 107 and 105 and the ground over lead 107′ in the connector; and contact 108 grounds supervisory lead 104′.

Relay 120 restores, due to the opening of this circuit at contacts 106 and 112, and the contacts associated therewith cause the following operations: contact 121 removes a ground from leads 103′ and 107′, and the ground on lead 107′ extended from the connector is now effective as the sole holding ground on control lead 103′; contact 122 removes ground from wipers 183 and 184 and their associated circuits; contact 123 opens a point in the operating circuit of relay 150 to prevent its operation when contacts 142 and 181 again make; contact 124 opens a point in the parallel pulsing paths of relays 130 and 150, and magnet 180; contact 125 removes holding ground from relay 140, causing relay 140 to restore; and contact 126 completes a path for energizing release magnet 190, said path extending through off-normal contact 182.

Relay 140 restores, the contacts associated therewith being ineffective at this time; and magnet 190 is energized to thereby restore wipers 183 and 184 to their respective home positions. Contact 182 opens the circuit through magnet 190 when the wipers are restored to normal, and magnet 190 is thereby deenergized.

It will now be noted that the only relay operated in the restrictor circuit is relay 100, and this relay will be released and restore the circuit to normal when ground is removed from lead 107′ following restoration of the connector.

Let us now follow the operation of restrictor circuit 8 associated with station 48, in response to the call from telephone 3714 to telephone 6421. Leads 185′ and 186′ in circuit 8 are connected to the fourth and eighth rotary contacts of the minor switch bank, respectively, thereby corresponding to a code of 48 rather than 64. Seizure of this circuit will be the same as described above for the circuit associated with station 64. However, when the calling party at station 37 dials digit 6, wiper 184 in restrictor circuit 8 will not be in contact with lead 185′ when relay 150 restores, and relay 160 will not operate. Thus, when relay 150 restores following the first dialled digit, relay 160 will not operate and the release magnet 190 will not operate since the circuit is open at contact 161. Subsequent digits will therefore pulse relay 110, but this pulsing will have no effect on the circuit since contact 152 will remain open. It should be noted that relays 110 and 120 remain operated, and that wipers 183 and 184 remain in the position to which they have been operated. When relays 110 and 120 are released following completion of the call between stations 37 and 64, release magnet 190 in restrictor circuit 8 will be operated from fround at contact 126 in the manner above-described. Thus, restrictor circuit 8 will remain seized during the call, but will be ineffective to transmit the call through to its associated connector.

Circuit 10, which has leads 185′ and 186′ both connected to the sixth rotary contact, will operate in response to the first dialled digit in the same manner as described above for circuit 9. However, the second dialled digit will be ineffective to operate relay 140, since wiper 184 would not be in contact with lead 186′ when relay 150 restores following the second digit. Thus, magnet 190 in restrictor circuit 10 would fail to operate following the second dialled digit, causing circuit 10 to be held inoperative in the same manner as described for circuit 8. Circuit 10 would not be released until the call is completed between stations 37 and 64.

While there has been described what is at present believed to be the preferred embodiment of the invention, various modifications may be made therein, and it is contemplated to cover in the appended claims all such modifications as fall within the true spirit and scope of the invention.

What I claim is:

1. In a telephone system, a series of remote stations, a plurality of substations in each station, a restricting circuit in each station and switching equipment associated with each circuit, means in each station operated upon initiation of a call therefrom for seizing all of said restricting circuits, means in each circuit operated in response to the transmission of impulses from the calling station, corresponding to the call number representing a called station, for rendering only the switching equipment associated with the circuit of the called station effective, and means in the restricting circuit of the called station responsive to further transmitted impulses, for operating the switching equipment to select one of the substations at the called station.

2. In a telephone system, a plurality of remote stations, a plurality of substations at each of said stations, a restricting circuit associated with each of said stations, a plurality of directory telephone numbers individually associated with said substations, said numbers consisting of station-designating and line-designating digits, means at each of said stations for seizing the restricting circuit associated therewith in response to the initiation of a call at a substation associated with another of said stations, a rotary switch in each of said restricting circuits, the rotary switch in each of said seized circuits operated responsive to receipt of digital impulses corresponding to said station-designating digits, switching equipment associated with each of said stations, said switching equipment rendered effective at only the called station depending on the operated position of said rotary switch, and means in the restricting circuit of the called station responsive to receipt of digital impulses corresponding to said line-designating digits, for operating the switching equipment associated therewith to select one of the substations at the called station.

3. In a telephone system as claimed in claim 2, means for counting said line-designating digits, and means for operating a supervisory signal associated with each of said restricting circuits, said last means operative at said called station in response to the counting by said counting means of the last line-designating digit.

4. In a restricting circuit, an incoming and an outgoing circuit, means for repeating digital impulses from the incoming to the outgoing circuit, a rotary switch including a wiper, means for operating said rotary switch and thereby stepping said wiper in response to receipt of digital impulses corresponding to a first digit, means for restoring said wiper to its normal position, said restoring means operative after receipt of said impulses corresponding to said first digit only if said wiper has been stepped to a first predetermined position, said operating means thereafter reoperated to step said restored wiper in response to receipt of digital impulses corresponding to a second digit, switching means, and means for thereupon rendering said repeating means effective only if said rotary switch wiper has been operated to a second predetermined position, said repeating means, when made effective, operated by digital impulses subsequently received over said incoming circuit, to repeat said subsequently received impulses over said outgoing circuit to said switching means to operate the same to select a called station.

5. In a restricting circuit as claimed in claim 4, means for counting said subsequent digits, and means for rendering a supervisory signal effective after a predetermined number of said subsequent digits have been counted.

6. A restricting circuit as claimed in claim 4, wherein said means for rendering said repeating means effective is also effective to cause said restoring means to reoperate and to condition said operating means to rotate said wiper one step in response to receipt of the impulses corresponding to each of said subsequently dialled digits, a supervisory signal, and means operated in response to the rotation of said wiper a predetermined number of steps to render said supervisory signal effective.

7. In a signalling system, a series of remote stations having individual digital codes, means at one of said stations for transmitting digital impulses, a plurality of substations at each of the other of said stations, equipment at each of said other stations for individually selecting said substations, repeating equipment associated with each of said other stations, a rotary switch including a switch wiper at each of said other stations, means individually associated with each of said rotary switches for operating said rotary switches and thereby rotating said switch wipers, means for operating said rotary switch operating means at each of said other stations in response to transmission of digital impulses at said transmitting station, to thereby render the repeating equipment effective at a particular one of said other stations due to the operated position of the wiper at said particular station corresponding to the individual digital code of said particular station, said repeating equipment at said particular station being thereafter operative to repeat subsequently transmitted digital impulses and operate said selecting equipment to thereby select a particular one or more of the substations associated therewith.

8. In a telephone system, a plurality of remote stations, a plurality of substations at each of said stations, a radio telephone transmitter at each of said stations, means at each of said stations including the transmitter associated therewith for transmitting coded radio impulses, a radio receiver at each of said stations normally conditioned to receive all coded impulses transmitted from any one of said stations, a restricting circuit at each of said stations and switching equipment associated with each circuit, means including said receivers responsive to the initiation of a call at a calling one of said substations for seizing the restricting circuits at those of said stations other than the station associated with said calling substation, means in each of said seized circuits operated in response to the transmission of coded radio impulses from the calling station corresponding to the call number representing a called station, for rendering only the switching equipment associated with the circuit of the called station effective, and means in the restricting circuit of said called station responsive to further transmitted radio impulses for operating the switching equipment to select one of the substations at said called station.

9. In a telephone system, a plurality of remote stations, a plurality of substations at each of said stations, a radio telephone transmitter at each of said stations, means at each of said stations including the transmitter thereat for transmitting coded radio impulses, a radio receiver at each of said stations normally conditioned to receive all coded impulses transmitted from any one of said stations, a restricting circuit at each of said stations and switching equipment associated with each of said circuits, means responsive to the initiation of a call at a calling one of said substations for seizing the restricting circuits at those of said stations other than the station associated with said calling substation, a rotary switch including a wiper in each of said circuits, means in each of said seized circuits for operating the rotary switch associated therewith in response to the transmission of radio impulses from the calling station corresponding to the call number representing a called station, for rendering only the switching equipment associated with the circuit of the called station effective in accordance with the operated position of the rotary switch wiper associated therewith, and means in the restricting circuit of said called station responsive to further transmitted radio impulses for operating the switching equipment to select one of the substations at said called station.

10. In a telephone system as claimed in claim 9, means in the restricting circuit of the called station for counting the digits represented by said further transmitted radio impulses, said counting means including said rotary switch, and means associated with said counting means for rendering a supervisory signal effective after a predetermined number of digits have been counted.

11. In a restricting circuit, an incoming circuit over which series of digital impulses are received and an outgoing circuit over which certain of said received impulses may be repeated, a switching equipment associated with said outgoing circuit, a rotary switch having a wiper, means in the circuit operated in response to certain received series of impulses to operate said switch to thereby step said wiper to different positions, repeating means in the circuit operative responsive to subsequently received digital impulses to repeat said subsequently received digital impulses over the outgoing circuit to said switching equipment to extend a connection to a called station, said repeating means effective to repeat said subsequent impulses only if said rotary switch wiper has been operated to a predetermined position.

References Cited in the file of this patent

UNITED STATES PATENTS

| | | |
|---|---|---|
| 1,644,727 | Jacobsen | Oct. 11, 1927 |
| 1,688,651 | Passmore | Oct. 28, 1928 |
| 1,883,680 | Friendly | Oct. 18, 1932 |
| 2,137,518 | Wicks | Nov. 22, 1938 |
| 2,307,855 | Pearce | Jan. 12, 1943 |
| 2,478,361 | Bartelink | Aug. 9, 1949 |
| 2,563,127 | McGoffin | Aug. 7, 1951 |